United States Patent [19]

Deml et al.

[11] 4,076,384
[45] Feb. 28, 1978

[54] REAR-PROJECTION VIEWING SCREEN

[75] Inventors: Reinhold Deml, Munich; Ulrich Greis, Weyarn; Wilfried Hofmann, Taufkirchen; Walter Rauffer, Munich, all of Germany

[73] Assignee: AGFA-Gevaert, A.G., Leverkusen, Germany

[21] Appl. No.: 680,877

[22] Filed: Apr. 27, 1976

[30] Foreign Application Priority Data

May 2, 1975 Germany .............................. 2519617

[51] Int. Cl.² ........................................... G03B 21/56
[52] U.S. Cl. ..................................... 350/122; 350/33; 350/45; 350/127; 353/38
[58] Field of Search ................. 350/122, 33, 45, 130, 350/127; 353/94, 7, 34, 38, 82

[56] References Cited

U.S. PATENT DOCUMENTS

| | | | |
|---|---|---|---|
| 755,196 | 3/1904 | Wadsworth | 350/127 X |
| 2,589,014 | 3/1952 | McLeod | 350/122 |
| 3,447,438 | 6/1969 | Kaufer et al. | 350/127 X |

FOREIGN PATENT DOCUMENTS

| | | | |
|---|---|---|---|
| 972,333 | 8/1950 | France | 350/122 |
| 421,231 | 12/1934 | United Kingdom | 350/122 |

*Primary Examiner*—Richard A. Wintercorn
*Attorney, Agent, or Firm*—Michael J. Striker

[57] ABSTRACT

The rear-projection viewing screen receives light incident upon its back side from the objective of a rear-projection projector and forms a corresponding image visible to a human eye viewing the front side of the viewing screen. The viewing screen is comprised of a lens-aperture matrix and an optical system cooperating with the lens-aperture matrix. The optical system serves the function of a lens matrix comprised of lens-matrix elements which focus the light from the objective of the rear-projection projector through the apertures of the lens-aperture matrix. The optical system furthermore serves the function of a field lens operative for gathering the light emanating from the objective of the projector and deflecting such light in direction toward the optical axis of the objective so as to increase the amount of light from the marginal portions of the viewing screen reaching a viewer's eye located on such optical axis.

10 Claims, 12 Drawing Figures

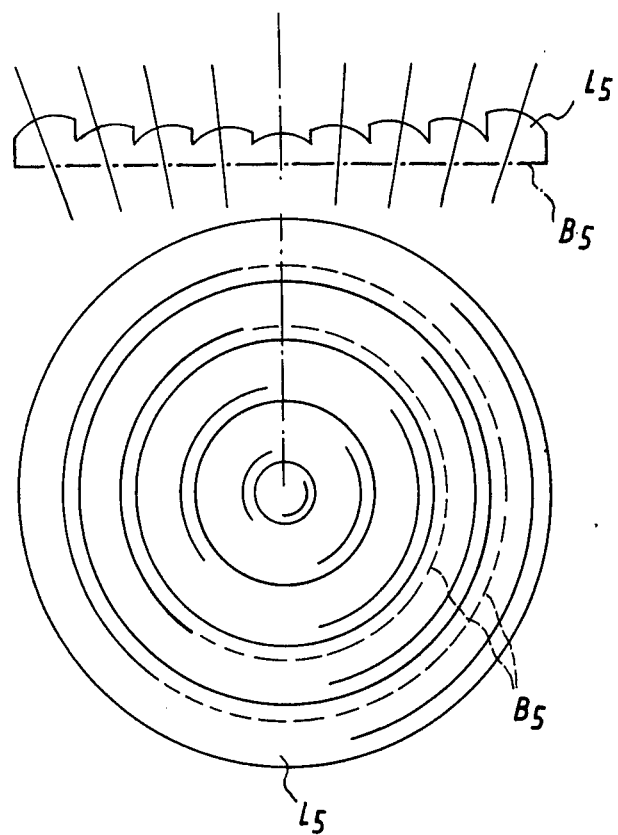

REAR-PROJECTION VIEWING SCREEN

BACKGROUND OF THE INVENTION

The invention relates to a rear-projection viewing screen of the type comprised of a lens-aperture matrix and a cooperating lens matrix, the apertures of the lens-aperture matrix corresponding in size, position and spacing to the size, position and spacing of the lens-matrix elements.

The basic optical principle of this type of rear-projection viewing screen is as follows: The apertures of the lens-aperture matrix lie in approximately the common focal plane of the elements of the lens matrix. The incident light received by each lens-matrix element is focussed at and projected through the associated aperture of the lens-aperture matrix. Accordingly, substantially all the light incident upon the back side of the viewing screen emerges from the front side of the viewing screen. However, because of the focussed passage of such light through the apertures of the lens-aperture matrix, the intensity of the light passing through each such aperture will be very considerably increased, compared to the intensity of the light incident upon the associated lens-matrix element. On the other hand, the image formed on the front side of the viewing screen is a dot image, necessarily exhibiting a reduced resolution. However, the loss of resolution associated with the dot image is more than offset by the boosted intensity of the light dots. Particularly if the viewing screen is viewed in a brightly lit room, the boosted intensity of the light dots of the dot image makes, on the whole, for an increased viewability or legibility of the image on the viewing screen. Additionally, the surface of the lens-aperture matrix surrounding the apertures thereof absorbs the ambient light, and may even be painted a dull black to maximize this absorption. This results in a rear-projection viewing screen of the "black surround" type; i.e., each light dot of boosted light intensity is surrounded by a black background which promotes a psychological impression of even further increased image light intensity, as a result of the strong background contrast.

An important disadvantage of known rear-projection viewing screens of this general type is that the marginal portions of the image appearing on the screen cannot be seen by the eye of a viewer if his eye lies for example on the optical axis of the objective of the rear-projection projector. The viewer can see all the marginal portions of the screen image only by moving his head in such a manner as to bring his eye within the viewing ranges associated with the marginal portions of the viewing screen.

This is depicted in FIG. 7a. It will be seen that the light emanating from the image dots near the marginal portion of the viewing screen does not reach a viewer's eye located on the optical axis of the projector objective.

The elimination of this problem in the case of conventional lens matrixes for microfilm viewing screens, for example, would require lens matrixes having relative apertures of 1:1.3, which can scarcely be realized in practice.

For this reason, it is known to insert a layer of light-scattering material behind viewing screens of the "black surround" type. This is shown in FIG. 7b. The scattering of the light emanating from the marginal portions of the viewing screen does cause some of such light to reach a viewer's eye located on the optical axis of the projector objective. Accordingly, the marginal portions of the screen image are at least faintly visible. However, the visibility is only faint. Moreover, the uniformity of the illumination of the screen achieved in this fashion is considerably inferior to what could be achieved using the same layer of light-scattering material in the conventional way as the viewing screen itself, without any lens matrix. The reason for this is that the scattering layer, due to the apertures, is illuminated only in discrete almost point-shaped regions, which in practice has an effect similar to a corresponding coarsening of the scattering layer structure.

SUMMARY OF THE INVENTION

It is a general object of the invention to provide a rear-projection viewing screen of the general type in question which, without the need for the troublesome scattering layer hitherto employed, nevertheless is characterized by uniform illumination of the entire viewing screen, particularly the marginal portions thereof.

This object can be achieved by associating with the lens-aperture matrix an optical system serving the functions of both a lens matrix comprised of lens-matrix elements which focus the light from the rear-projection projector through the apertures of the lens-aperture matrix, and furthermore serving the function of a field lens operative for gathering the light emanating from the objective of the projector and deflecting such light in direction toward the optical axis of the objective so as to increase the amount of light from the marginal portions of the viewing screen reaching a viewer's eye located on such optical axis.

As a result of the use of one of the inventive viewing screens, the viewability region of the screen image for a viewer's eye on the optical axis of the projector objective is enlarged to include all the marginal portions of the screen image. This is shown in FIG. 7c.

The optical system serving the functions of both a lens matrix and a field lens can be comprised of two discrete components each serving one of those functions, or alternatively the optical system can be composed of a single optical structure serving both functions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a section, taken on a diametral plane, through a viewing screen in which the functions of the lens matrix and of the Fresnel field lens are performed by a single optical structure, and in which the apertures of the lens-aperture matrix are concentric annular slit apertures;

FIG. 5a is a top view of the viewing screen of FIG. 5;

DESCRIPTION OF THE PREFERRED EMBODIMENTS

Figure 1:
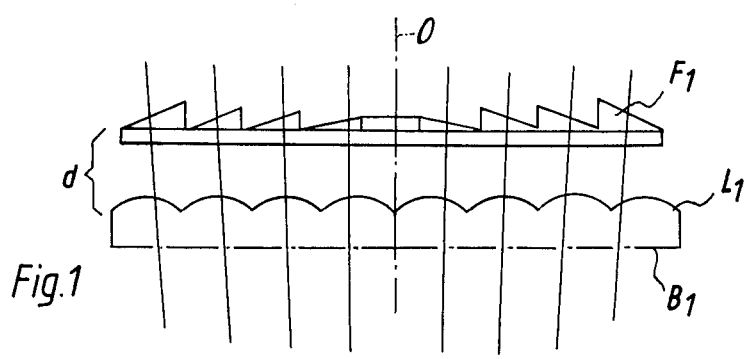
FIG. 1 is a section, taken on a diametral plane, through an inventive rear-projection viewing screen, utilizing a Fresnel field lens discrete from the lens matrix of the viewing screen.

The simplest embodiment of the invention "black surround" rear-projection viewing screen with light-directive action is depicted in FIG. 1. The viewing screen of FIG. 1 is essentially composed of two optical structures. The first is the conventional combination of a lens-aperture matrix $B_1$ and a lens matrix $L_1$. In conventional manner, the size, position and spacing of the apertures of lens-aperture matrix $B_1$ corresponds to the size, position and spacing of the individual lens elements of the lens matrix $L_1$. The second of the two optical structures is a Fresnel lens $F_1$ of suitable focal length, located in this embodiment at the back side of the viewing screen.

The insertion of the Fresnel field lens $F_1$ behind the lens matrix/lens-aperture matrix combination $L_1$, $B_1$ in FIG. 1 alters the optical cooperation between the lens matrix $L_1$ and the lens-aperture matrix $B_1$. Specifically, the effect of the Fresnel field lens $F_1$ is to deflect the light rays passing therethrough in direction toward the optical axis of the projector objective (not depicted in FIG. 1). As a result, each aperture of the lens-aperture matrix $B_1$, and particularly those apertures located at the marginal portions of the viewing screen, will no longer be in proper register with the associated lens-matrix elements. It is necessary to take into account this inward deflection in the actual design and production of the lens matrix-lens-aperture matrix combination $L_1$, $B_1$. Specifically, what this involves is the shifting of the annular groups of apertures of the lens-aperture matrix $B_1$ in radially inward direction by distances corresponding to the radially inward deflection of the light rays passing through the associated lens-matrix elements as a result of their prior passage through corresponding annular zones of the Fresnel field lens $F_1$. The resulting structure will be such that the apertures of the lens-aperture matrix $B_1$ will no longer coincide with the centers of the associated lens-matrix elements, but instead will be somewhat radially inward shifted relative to such centers.

In the construction of FIG. 1, it is to be understood that the Fresnel field lens $F_1$ is composed of concentric annular zones, whereas the lens matrix/lens-aperture matrix combination $L_1$, $B_1$ is of the generally conventional type, in which the lens elements and apertures are disposed in a rectangular matrix. The conjunction of the circular Fresnel field lens geometry and the rectangular lens matrix/lens-aperture matrix geometry results in unavoidable Moire effects.

It is possible to decrease these Moire effects by increasing the spacing d between the Fresnel field lens $F_1$ and the matrix combination $L_1$, $B_1$. However, as will be understood by persons familiar with optical principles, the decrease in the Moire effects is achieved at the expense of the quality of the image on the viewing screen. The Fresnel field lens is of poor optical quality, compared to a simple field lens, and is not suitable for the formation of sharp focussed images. For that reason, it is desired to minimize the image-quality-deterioration effect which the Fresnel lens has upon the lens matrix $L_1$ by positioning the Fresnel lens $F_1$ as close as possible to the focal plane of the lens matrix $L_1$. However, as just explained, the closer the circular Fresnel field lens $F_1$ is to the rectangular matrix combination $L_1$, $B_1$, the greater are the Moire effects. Therefore, if the construction of FIG. 1 is utilized, one must make some kind of compromise between image quality deterioration, on the one hand, and the development of Moire effects, on the other hand.

Figure 2:
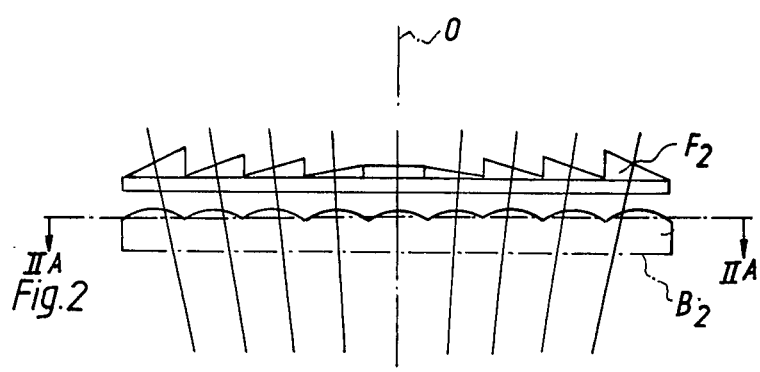
FIG. 2 is a view similar to FIG. 1, but showing the proper matching of the annular zones of the lens matrix to the annular zones of the Fresnel field lens.

The need for such a compromise is avoided with the construction shown in FIG. 2, which is characterized by total absence of Moire effects without any loss of the quality of the image on the viewing screen. In the construction of FIG. 2, the elements of the lens matrix $L_2$, and likewise the apertures of the lens-aperture matrix $B_2$, are arranged in concentric annular groups whose geometry corresponds to the concentric annular geometry of the circular Fresnel field lens $F_2$. Accordingly, the matrix combination $L_2$, $B_2$ of FIG. 2 has a rotation-symmetrical geometry, as compared to the basically rectangular geometry of the matrix combination $L_1$, $B_1$ of FIG. 1.

Figure 2A:
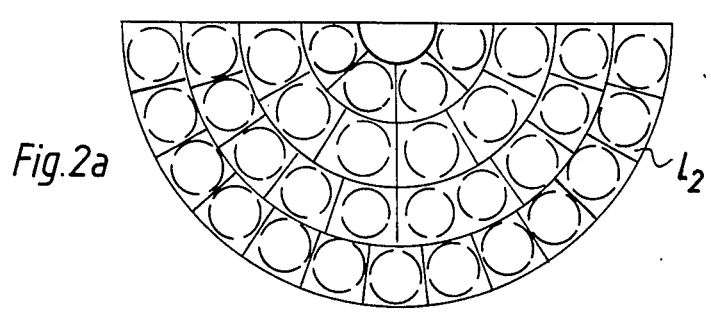
FIG. 2a is a section taken on a plane corresponding to section line IIA—IIA of FIG. 2.

FIG. 2a is a sectional view taken on a section plane corresponding to the section line IIA—IIA of FIG. 2. FIG. 2a makes plain the arrangement of the elements of the lens matrix $L_2$ in concentric annular groups or zones corresponding to the annular zones or elements of the circular Fresnel field lens $F_2$. The radial lines in FIG. 2a together with the circular lines form four-sided areas representing the outlines of the base portions of the lens elements of the lens matrix $L_2$. The broken-line circles show the cross-sectional outline of the individual lens-matrix elements at the level of the section plane IIA—IIA. As can be seen from FIGS. 2 and 2a, the upper portion of each lens-matrix element is of approximately spherical shape. In FIG. 2a, the Fresnel field lens $F_2$ itself and also the lens-aperture matrix $B_2$ of the matrix combination $L_2$, $B_2$ have been omitted for the sake of clarity.

Figure 3:
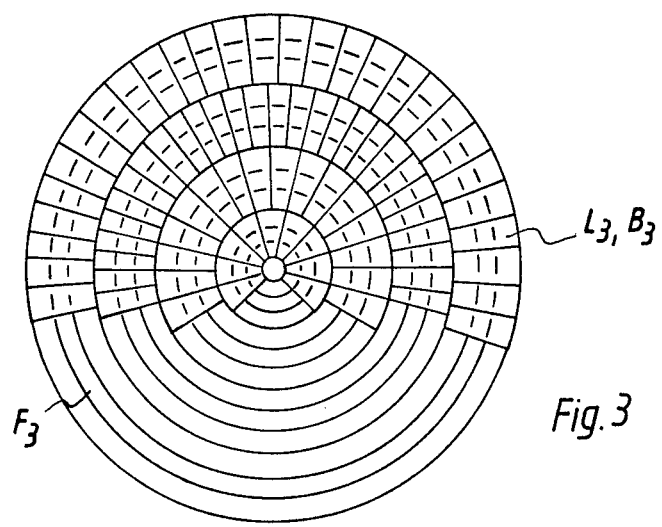
FIG. 3 depicts a configuration for the lens-aperture matrix and the lens matrix suitable for cooperation with a discrete Fresnel field lens.

FIG. 3 depicts another construction which completely eliminates Moire effects without any sacrifice of image quality. Here again, a Fresnel field lens $F_3$ is positioned just back of the lens matrix/lens-aperture matrix $L_3$, $B_3$. Part of the matrix combination $L_3$, $B_3$ is broken away, to permit an unobstructed view of part of the Fresnel lens $F_3$. As before, the Fresnel lens is of rotation-symmetric geometry, being composed of concentric annular lens elements or zones. The lens elements of the lens matrix $L_3$ in this embodiment are radially oriented and of generally cylindrical shape. They are arranged in concentric annular groups or zones, each group or zone being associated with three adjoining annular zones of the Fresnel lens.

It will be noted that the radially oriented, generally cylindrical lens-matrix elements of FIG. 3 intersect the annular zones of the Fresnel lens $F_3$ generally orthogonally. If the intersection is not orthogonal but instead inclined, then considerable Moire effects will arise. Because the overlapping of the three-zone long lens-matrix elements and the annular lens elements of the Fresnel lens is generally quadratic, the basic optical action will be substantially the same as with the construction of FIGS. 2 and 2a, although there will be some loss of image quality. For proper cooperation with a lens matrix $L_3$ of this geometry, the lens-aperture matrix $B_3$ will be provided with radially extending slit apertures whose size, position and spacing corresponds to the size, position and spacing of the radially extending, generally cylindrical elements of lens matrix $L_3$.

Figure 4:
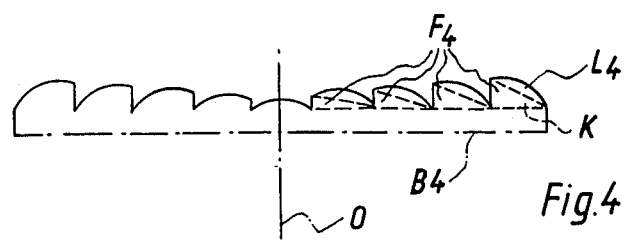
FIG. 4 is a section, taken on a diametral plane, through a rear-projection viewing screen according to the invention in which the functions of the lens matrix and of the Fresnel field lens are performed by a single optical structure.
Figure 4A:
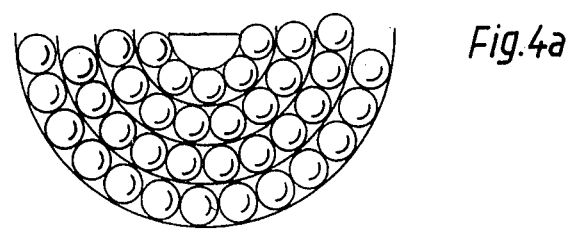
FIG. 4a is a top view of the viewing screen of FIG. 4.

FIG. 4 depicts a construction which constitutes a considerable improvement over the ones described above, both with respect to optical action and practical considerations. In the construction of FIG. 4, the functions of both the lens matrix and the Fresnel field lens are performed by a single optical structure, here a unitary body of optical material. FIG. 4a is a top view of the construction of FIG. 4a and facilitates its visualization.

The lens-matrix elements of lens matrix $L_4$ are superimposed upon the annular lens elements of a circular Fresnel field lens $F_4$, resulting in a rotation-symmetric structure having concentric annular zones corresponding to those of the Fresnel lens. Each annular zone of the structure is comprised of a plurality of circumferentially successive lens-matrix elements of generally spherical shape, as can be seen in FIG. 4a. The base portions of each of these spherical lens-matrix elements is inclined relative to the general plane of the viewing screen. Moreover, the angle of incline increases as one proceeds radially outward from one annular group of lens-matrix elements to the next. It will be understood that the angle of incline for the lens-matrix elements of each annular zone of the structure corresponds to the incline of the corresponding annular lens element of an analogous Fresnel lens — i.e., each angle of incline is selected in dependence upon the focal length which a corresponding discrete Fresnel lens would have and in dependence upon which one of the annular zones of the Fresnel lens is being considered.

The construction of FIG. 5 is a modification of that of FIG. 4. Here, the plurality of spherical lens-matrix elements in each annular zone of the optical structure of FIG. 4 is replaced by a single toroidal lens-matrix element for each annular zone of the optical structure. As with the construction of FIG. 4, the base of each toroidal lens element of the lens matrix $L_5$ is inclined, relative to the general plane of the viewing screen, by an angle of incline which increases when proceeding radially outward from one annular zone to the next. Because the lens-matrix elements in FIG. 5 are toroidal, the cooperating apertures of the lens-aperture matrix $B_5$ are concentric annular slits, whose size, position and spacing correspond to those of the toroidal lens-matrix elements. This is in contrast to the construction of FIG. 4 where the apertures of the lens-aperture matrix were circular point-like apertures corresponding in size, position and spacing to the spherical elements of lens matrix $L_4$. The quality of the image formed with the viewing screen of FIG. 5 is somewhat inferior to that of the image formed with the screen of FIG. 4. However, it will be appreciated that the construction of FIG. 5 is considerably easier to produce, particularly for example when the production technique employed involves the use of masters formed by a mechanical engraving process. Although the contrast-boosting effect produced with the screen of FIG. 5 is somewhat inferior to that of FIG. 4, it has been found to suffice in actual use.

In general, masters for use in making the Fresneal lenses or combined Fresnel lens/lens matrix structures described above can be produced using conventional mechanical engraving or stamping techniques. In the case of the construction of FIG. 4, with its spherical lens-matrix elements, a suitable master can be produced using a corresponding spherical stamping element mounted on a circular guide rail for movement into each of the positions in which the stamping element is to perform a stamping operation upon the body which is to be converted into the master. The mounting means for the spherical stamping element can include suitable pivot means for imparting the desired angle of incline to each spherical depression formed in the master, in correspondence to the Fresnel lens geometry discussed above with respect to FIGS. 4 and 5.

When making a master for producing optical structures like that shown in FIG. 5, the only modification of the conventional engraving techniques used for making masters for Fresnel lenses is that the profile of the cutting tool should be not straight, but instead convex spherical and have a radius corresponding to the cross-sectional radius of the toroidal lens element associated with the annular depression being formed in the body which is to be converted into the master.

To produce a viewing screen capable of displaying images of high resolution, the lens structure of the viewing screen should have at least from about 7 to 10 lens elements per millimeter, proceeding in radial direction. The production of Fresnel lenses having so high a density of lens elements can be effected by photomechanical relief techniques applied to chromate gelatine layers or photoresist layers. Such techniques are disclosed in commonly owned U.S. Pat. Nos. 3,775,110 and 3,893,856, in allowed commonly owned copending U.S. Pat. application No. 385,192, and in commonly owned copending U.S. Pat. application No. 442,140, the entire four disclosures of which are incorporated herein by reference.

The dimensioning of the field lens depends upon the spacing of the projector and the viewer's eye. The magnitude of the individual elements in turn depends upon the viewing distance and upon the desired resolution. The individual elements can have a size ranging, for example, from about 1/500 to about 1/2000 of the diameter of the viewing screen; the resulting resolution would correspond to that achieved with conventional television screen images. This would involve a number of annular zones between about 250 and 1000.

Figure 6:
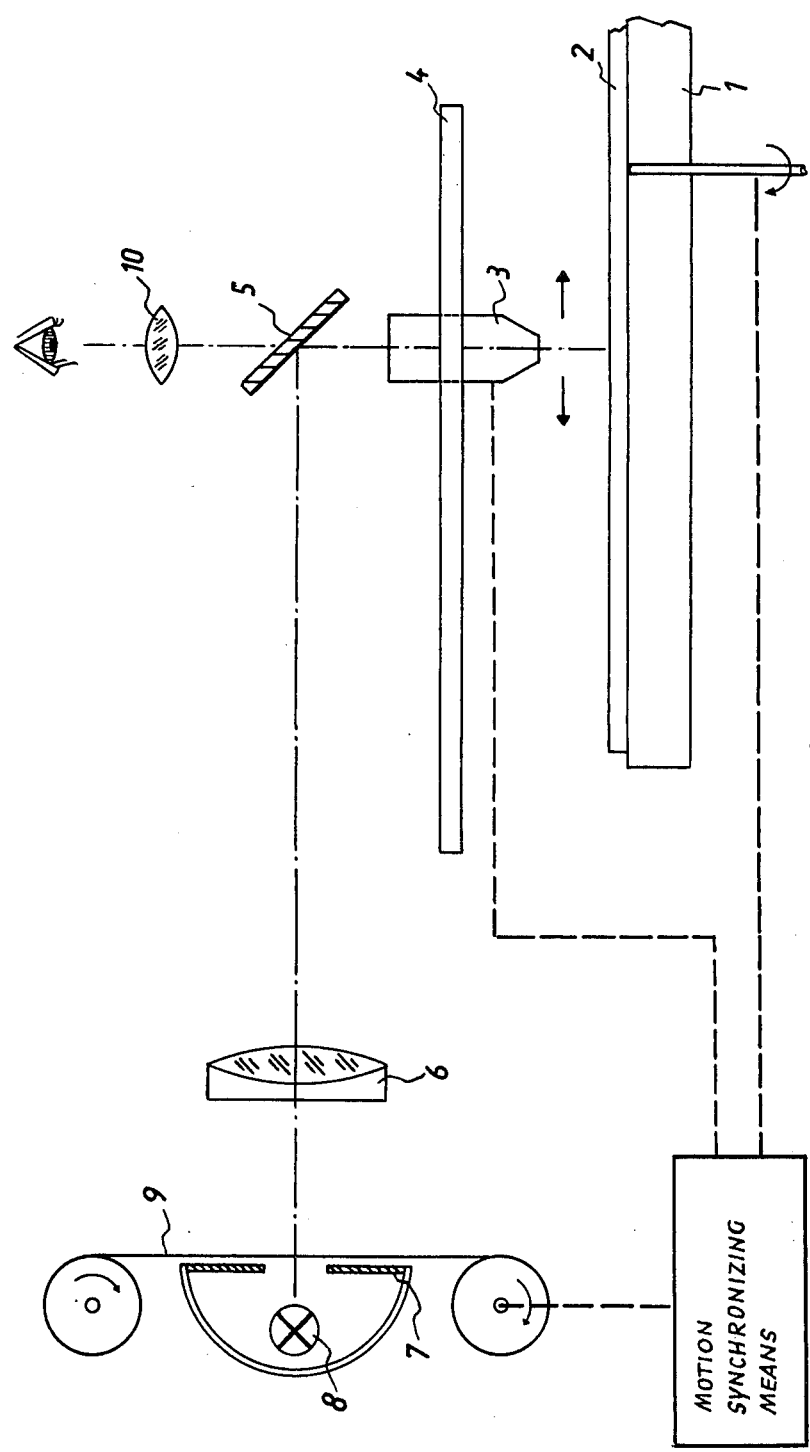
FIG. 6 depicts an arrangement for producing the lens matrix or field lens/lens matrix combination by photomechanical means.
Figure 7A:
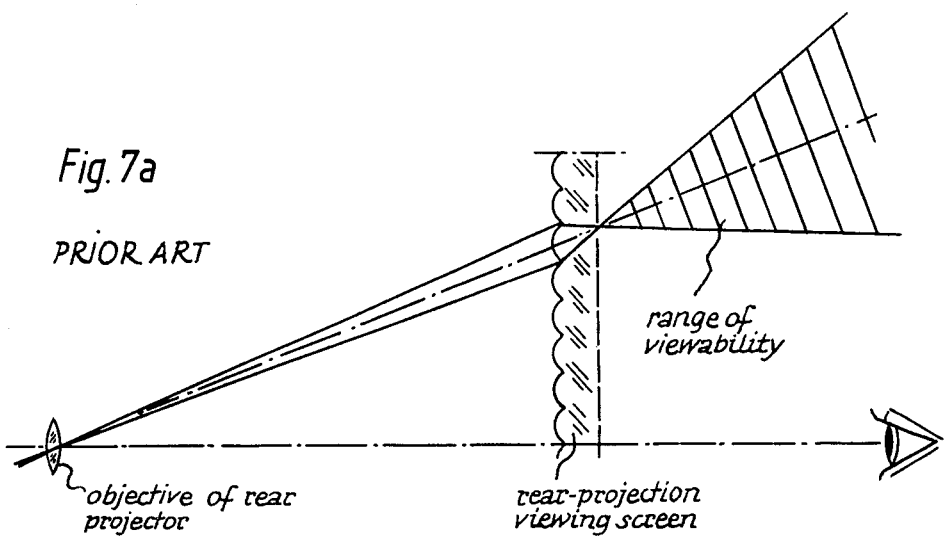
FIG. 7a depicts the reasons why the marginal portions of the images on conventional "black surround" rear-projection viewing screens are usually not visible to a viewer's eye located on the optical axis of the objective of the rear-projection projector.
Figure 7B:
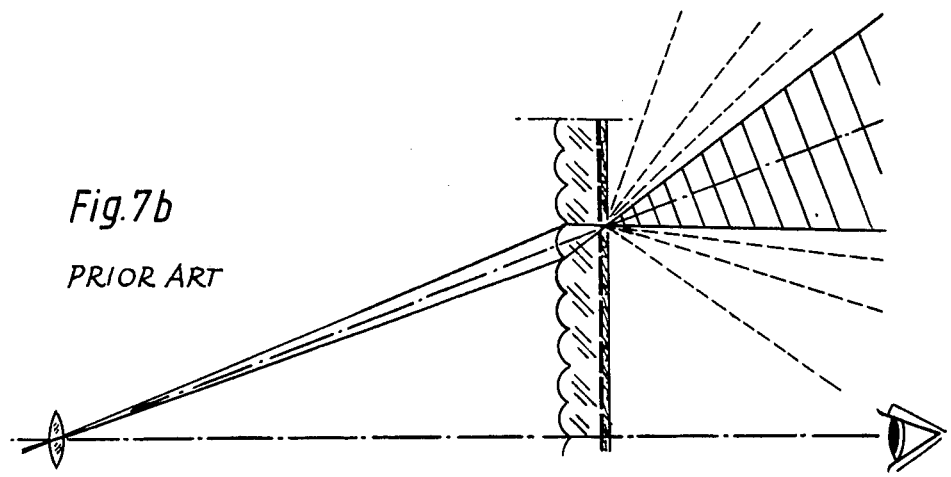
FIG. 7b depicts the result of one prior-art attempt at dealing with this problem.
Figure 7C:
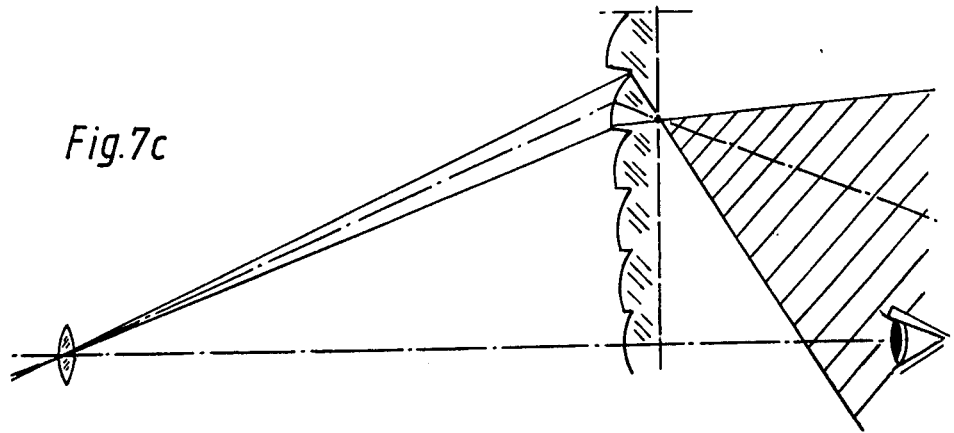
FIG. 7c depicts the result achieved when use is made of the inventive expedient.

A set-up for producing a suitable rotation-symmetric optical phase structure by photomechanical means is schematically depicted in FIG. 6. A layer 2 of photosensitive material is positioned on a very precisely positionable rotary table 1. A short-focal-length focussing optic 3 is mounted on a guide rail 4 for movement along a straight line corresponding very precisely to a common radius of the circles defined by the rotation of rotary table 1. Optic 3 cooperates with a mirror 5 and a collimator optic 6 to project onto the photosensitive layer 2 a very sharp image of the aperture of a diaphragm 7 which is illuminated by a light source 8. Mirror 5 is a semitransmissive mirror, permitting direct visual observation of the position of the image of the diaphragm aperture in the actual plane of the photosensitive material 2.

Arranged very near to the plane of the aperture of diaphragm 7 is a translucent film 9. The film 9 is transported past the aperture of diaphragm 7 in synchronism with the rotation of rotary table 1 and the radial shifting movement of focussing optic 3. In this way, portions of the photosensitive layer 2 corresponding to individual elements of the Fresnel lens or Fresnel-type viewing screen structure to be formed will be illuminated by light of appropriate intensity, one after the other. The movements performed will be intermittent and/or continuous, depending upon which of the viewing screen constructions described above is involved. The transparency of film 9 varies in the direction of its length, on the one hand in correspondence to the mechanical dimensions of the viewing screen structure to be ultimately produced, and on the other hand taking into consideration the gradation and other photographic characteristics of the photosensitive material employed. In this way, it is possible to control with great precision the geometry of the wedge-profiled, spherical or inclined spherical shapes to be formed; additionally, using this production technique for the master, it is easy to produce lens matrixes or field lens/lens matrix combinations whose elements are aspherical or provided with supplemental periodic or nonperiodic phase structures (cineform lenses).

For the production of simple Fresnel lenses or Fresnel-type viewing screens like that of FIG. 5, it may be sufficient to perform the illumination of the photosensitive layer 2 in a continuous operation; for the production of a viewing screen structure comprised of a plurality of spherical lens matrix elements, use will usually be made of pulsed light which can be generated by intermittently energizing the light source, by utilizing suitable shutter devices, sector diaphragms, or the like.

In principle, the aforedescribed set-up can be used to form the relief pattern of the master directly upon the material of the body which is to be made into the master, using of example an ultraviolet light source such as a very-high-pressure mercury lamp. However, it is likewise possible and satisfactory to first of all form a transparency mask of corresponding gradation upon a conventional photographic emulsion and only thereafter, in a second process step, illuminate the transparency mask while it is in contact with the phase material to be worked.

It will be understood that each of the elements described above, or two or more together, may also find a useful application in other types of constructions differing from the types described above.

While the invention has been illustrated and described as embodied in rear-projection viewing screens, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rear-projection viewing screen operative for receiving light incident upon its back side from the objective of a rear-projection projector and forming a corresponding image visible to a human eye viewing the front side of the viewing screen, the rear-projection viewing screen comprising a lens-aperture matrix; and optical means serving the function of a lens matrix comprised of lens-matrix elements which focus the light from the objective of the rear-projection projector through the apertures of the lens-aperture matrix and furthermore serving the function of a field lens operative for gathering the light emanating from the objective of the projector and deflecting such light in direction toward the optical axis of the objective so as to increase the amount of light from the marginal portions of the viewing screen reaching a viewer's eye located on such optical axis.

2. A rear-projection viewing screen as defined in claim 1, wherein the optical means includes a lens matrix and a field lens discrete therefrom.

3. A rear-projection viewing screen as defined in claim 1, wherein the optical means includes a lens matrix and a Fresnel field lens discrete therefrom.

4. A rear-projection viewing screen as defined in claim 1, wherein the optical means includes a lens matrix and a Fresnel field lens at the back side of the viewing screen spaced from the lens matrix a distance between about 0.5 mm and about 10 mm.

5. A rear-projection viewing screen as defined in claim 1, wherein the optical means comprises a lens matrix comprised of lens-matrix zones and a Fresnel field lens comprised of field-lens zones, the field-lens zones being congruent with the lens-matrix zones.

6. A rear-projection viewing screen as defined in claim 1, the optical means including a lens matrix comprised of a plurality of concentric annular lens-matrix zones, the lens matrix being formed of a plurality of radially oriented lens-matrix elements, each annular lens-matrix zone being constituted by a plurality of circumferentially successive ones of the radially oriented lens-matrix elements, the optical means furthermore including a Fresnel field lens comprised of a plurality of concentric annular field-lens zones cooperating with the concentric annular zones of the lens matrix, the lens-aperture matrix being provided with radially extending slit apertures corresponding in size, position and spacing to the size, position and spacing of the radially extending lens-matrix elements.

7. A rear-projection viewing screen as defined in claim 1, wherein the optical means is comprised of a single body of optical material serving both the aforesaid lens-matrix function and the aforesaid field-lens function.

8. A rear-projection viewing screen as defined in claim 1, the optical means being comprised of a single optical structure serving both the aforesaid lens-matrix function and the aforesaid field-lens function, the single optical structure being comprised of a plurality of lens-matrix elements disposed in a rotation-symmetrical arrangement, the lens-matrix elements each having an orientation which is inclined relative to the general plane of the viewing screen, the angle of incline increasing in radially outward direction from one lens-matrix element to the next.

9. A rear-projection viewing screen as defined in claim 8, the lens-matrix elements being arranged in concentric annular zones each containing a pluraliity of lens-matrix elements.

10. A rear-projection viewing screen as defined in claim 8, the lens-matrix elements being arranged in concentric annular zones, each zone being constituted by a single respective annular lens-matrix element, the lens-aperture matrix being provided with a family of concentric annular slit apertures corresponding in size, position and spacing to the size, position and spacing of the annular lens-matrix elements.

* * * * *